United States Patent [19]

Astegiano et al.

[11] 4,252,998
[45] Feb. 24, 1981

[54] IDENTIFIER FOR MANUAL SWITCHBOARDS WITH CONFERENCE FACILITY

[75] Inventors: Luciano Astegiano, Turin; Wouter M. D. Van Ween, Ceretta di S. Maurizio, both of Italy

[73] Assignee: CSELT - Centro Studi e Laboratori Telecomunicazion S.p.A., Turin, Italy

[21] Appl. No.: 953,163

[22] Filed: Oct. 20, 1978

[30] Foreign Application Priority Data

Oct. 21, 1977 [IT] Italy .............................. 69356 A/77

[51] Int. Cl.³ .......................................... H04M 5/04
[52] U.S. Cl. ............................ 179/8 A; 179/18 FH; 179/91 R; 179/27 DB; 179/7 R
[58] Field of Search .............. 179/8 R, 8 A, 18 FH, 179/27 DB, 15 A, 172.5, 7 R, 91 R, 27 FC

[56] References Cited

U.S. PATENT DOCUMENTS

| | | | |
|---|---|---|---|
| 3,761,635 | 9/1973 | Gibson et al. | 179/18 FH |
| 3,828,140 | 8/1974 | Blane et al. | 179/27 DB |
| 3,959,593 | 5/1976 | Mehta | 179/8 A |
| 4,103,113 | 7/1978 | Sato et al. | 179/27 FC |

*Primary Examiner*—Gerald L. Brigance
*Attorney, Agent, or Firm*—Karl F. Ross

[57] ABSTRACT

A line identifier at a telecommunication switchboard comprises a matrix of magnetic-induction elements serving as current sensors for detecting a request for establishing a connection between a selected incoming line and a selected outgoing line. The sensors are connected to a multiplexer for providing samples in a time-division mode to a logic circuit controlled by a pair of microprogrammers and addressing a read/write memory for storing information on the states of the sensors. The logic network, upon receiving from a sensor an identification request for a selected outgoing line, such request implicitly coding a selected input line, activates a relay which closes a circuit enabling the energization of a sensor whose output signal to the logic network identifies the outgoing line selected via the switchboard for connection to the prior-identified incoming line. Upon successful identification of a selected incoming line and at least one selected outgoing line, the logic network emits energization signals to a pair of relays which thereupon break the circuits energizing the sensors and establish a link between the selected incoming line and the selected outgoing line. The logic network is connected via its control microprocessors to a computer for communicating thereto the identities of interconnected lines. The logic network with its associated multiplexer and microprocessors may be duplicated for cross-checking operations.

7 Claims, 6 Drawing Figures

IDENTIFIER FOR MANUAL SWITCHBOARDS WITH CONFERENCE FACILITY

FIELD OF THE INVENTION

The present invention relates to telephone operators' switchboards and is particularly concerned with an identifier for manual switchboards with conference facility, able to associate with each operator semicord the truck engaged thereby and to send related information to automatic accounting equipment, even if two operators engage the same trunk at the same time.

BACKGROUND OF THE INVENTION

As known, for operator-assisted call accounting, it is necessary to collect and correlate data from different connecting points, for example from switchboards and some other points of an exchange: more particularly, it is worth knowing the identity of the switchboard and semicord used for the call (datum present at the switchboard) and the identity of a trunk engaged by each semicord (datum present at the exchange).

Devices for detecting and correlating information coming from different points of a connection, particularly the identity of a calling subscriber and the identity of a called subscriber, are known in the art of telephone switching. Any stage marker of an indirect-control exchange represents an example.

Yet these devices detect the two ends of a connection to be set up and set up the connection by choosing a free path. Then, they cannot be used when, as for the operator-assisted call accounting, it is necessary to know the data of a connection set up manually by an operator without the help of automatic devices.

Furthermore, because the conventional identifiers operate on automatic exchanges, they cannot operate when the same line is used by many connections at the same time, i.e. in the case of a conference among many operators or of a connection transfer from an operator to another.

OBJECT OF THE INVENTION

The object of our present invention is to provide a device of the above-described type which allows the double identifications necessary for conferences between operators and which, thanks to its particular structure, allows supervision of switchboard and trunk operation.

SUMMARY OF THE INVENTION

A line identifier for manual switchboards comprises, according to our present invention a peripheral part, consisting of a first group of units shared by the semicords and of a second group of units shared by the operator's trunks, and a central part connected on the one hand to the peripheral unit and on the other hand to a computer. The peripheral part includes means able to recognize the presence of direct currents on wires of said the switchboard semicords and of the operator's trunks, as a consequence of a connection set up between a semicord and a trunk; means controlled by the central part and able to select, for the identification, only one semicord among a plurality thereof, and means able to cut the loop formed by a semicord and an operator's trunk by switching it towards the current-detecting means, as long as the identification is taking place, or towards the semicord extension and towards the trunk when the identification has taken place. The central part is microprogrammed to receive from the peripheral units information relating to switchboard currents, sent by the peripheral part as logic samples and as time division-multiplexed frames; to carry out on these samples the logic operations necessary for detecting identification requests from the semicords; and to recognize, according to the sample position in the frame, the identity of a semicord and of a trunk engaged thereby during a connection; said central part is able to receive from the computer, for interpretation operational orders concerning the units of the peripheral part connected to the trunks, to send to the computer, for each identification, messages containing the identity of the semicord and of the trunk connected in a connection and to send to said peripheral part, according to the result of the logic operations carried out and/or of the commands coming from the computer, operational orders for the selection of a semicord and for the cutting of the loops.

BRIEF DESCRIPTION OF THE DRAWING

A preferred embodiment of this invention will now be described, by way of example and not in a limiting sense, with reference to the accompanying drawing wherein.

SPECIFIC DESCRIPTION

Figure 1:
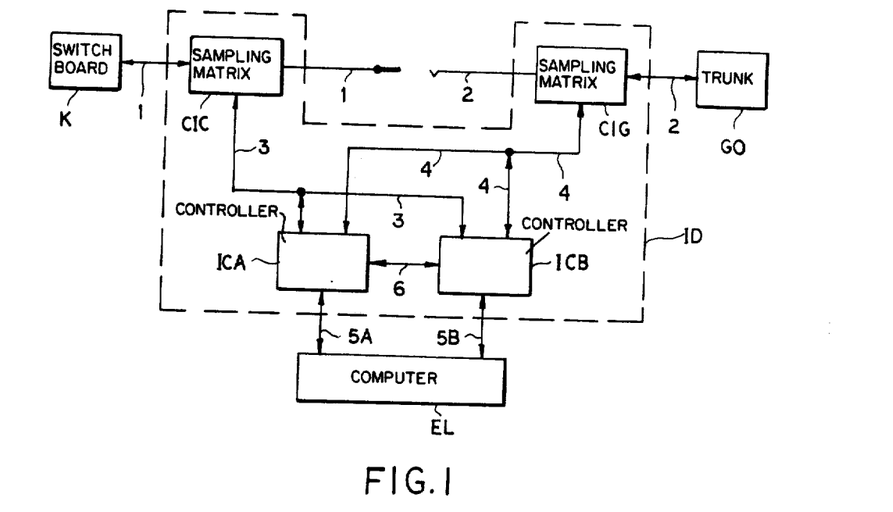
FIG. 1 is a block diagram showing the connection of a line identifier according to our present invention to manual switchboards and to the outgoing trunks.

In FIG. 1, blocks K and GO represent the cord switchboards and the operator trunks, respectively, of a manual switching exchange; references 1 and 2 denote the semicords and the trunk incoming circuits.

Reference ID denotes a line identifier, according to our present invention, consisting of a peripheral part, composed by units connected to each semicord or each trunk incoming circuit, respectively, for collecting the electric signals required for the identification process, and a central part for signal processing; the central part can be duplicated. In the drawing, the peripheral part comprises sampling matrices CIC, CIG connected to semicords 1 and to trunk incoming circuits 2, respectively; the central part, comprises two similar control units ICA, ICB. These two units are connected by the "Master-Slave" technique so as to interchange the respective tasks at each identification operation. The structure of identification circuits or matrices CIC, CIG and of units ICA, ICB will be described hereinafter.

Reference EL denotes a computer recording the accounting data of the operator-assisted traffic, which receives from identifier ID the information on the identifications carried out and sends to identifier ID possible commands.

Connections 3, 4 link identification circuits CIC, CIG and central parts ICA, ICB; connections 5A, 5B link the central part and computer EL.

Figure 2:
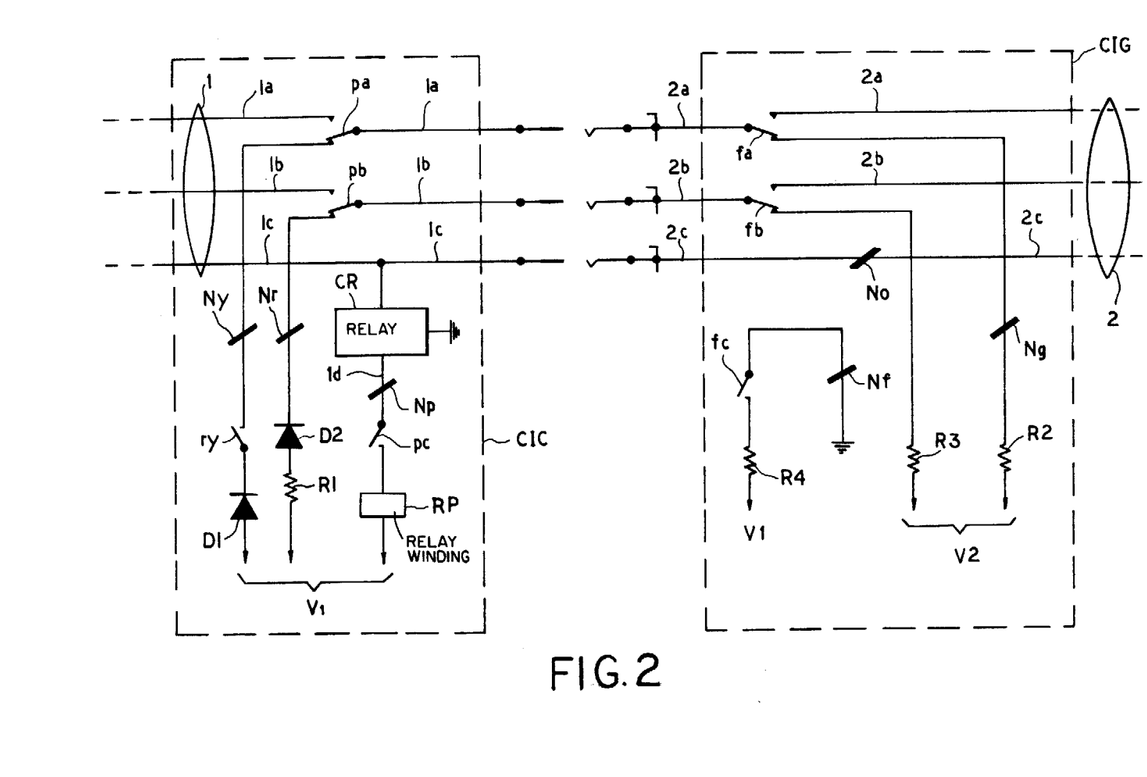
FIG. 2 is a circuit diagram of sampling matrices, shown in FIG. 1, for collecting from the cords and from the trunks the signals required for a single identification.

FIG. 2 shows the electric scheme of the part of the identification circuits connected to a semicord 1 and to an incoming circuit 2 of a trunk GO (FIG. 1), assumed to be connected during a call.

References 1a, 1b and 2a, 2b denote the conversation wires of the semicord and of the trunk incoming circuit, respectively.

References pa, pb represent a pair of contacts of a first relay P, whose operation is controlled by the central part ICA, ICB of the identifier. Relay P is attracted as long as current is present on the third semicord wire 1c. Contacts pa, pb cut and switch the loop towards either sensors Ny, Nr or the loop extension of the semicord. When contacts pa, pb are switched towards sensors Ny, Nr, the latter can detect the direct currents present at the semicord wires and send the related information to central part ICA, ICB for the identification, as described hereinafter. Sensors Ny, Nr and the other sensors Np, Nf, Ng of circuits CIC, CIG described hereinafter can be magnetic cores with a rectangular hysteresis cycle and organized into matrices. By way of example, a matrix for each switchboard K can be assumed to exist this is able to collect in parallel the data coming from all the semicords of said switchboard, to sample them and to form sample serial frames. The outputs of all the matrices of cores CIC and CIG flow topether into connections 3 and 4; central units ICA, ICB are provided with means for organizing all the incoming frames so that each device (semicord or trunk) is assigned its own time slot.

A contact ry of a second relay is connected in series to core Ny; said contact is actuated by central part ICA, ICB of the identifier as answer to an identification request and is operated for the duration of the operation command. Such second relay is hereinafter called "relay Y".

A third sensor Np connected in series to a third contact pc of relay P sends to central part ICA, ICB signals confirming that relay P has been operated and consequently the loop is closed.

In FIG. 2, core Np and contact pc are shown serially inserted in wire 1d, connected to wire 1c of semicord 1 through a block CR representing the means which ensure the holding of relay P for the duration of current in wire 1c; it is clear that other solutions are possible. Block CR is not described in detail, because devices carrying out its functions are known in the art.

Wire 1d is also connected to a holding winding RP of relay P; the operating winding of the same relay and the windings of the other relays of the identification circuits are not represented for the sake of simplicity.

References fa, fb indicate a pair of contacts of a third relay, hereinafter called "relay F", actuated by the central part of the identifier; contacts fa, fb have to cut and to switch the loop of circuit 2 towards trunks GO (FIG. 1) or towards the units of CIG, particularly towards core Ng (FIG. 2) connected to wire 2a of said loop. When contacts fa, fb are switched towards sampling matrix CIG, core Ng can detect the direct currents present at wire 2a and send the related information to central part ICA, ICB (FIG. 1) of the identifier.

A second core Nf of matrix CIG is connected in series to another contact fc of relay F for carrying out the operation check of said relay.

Reference No indicates a third core of matrix CIG, connected to wire 2c of the trunk incoming circuit, which has to signal to the central part of the identifier the busy state of the trunk.

References D1, D2, R1, R2, R3, R4 denote diodes and resistances connected in series to loop wires or to the wires connected to the check cores, in order to establish the suitable current paths. Two d.c. voltage sources V1 and V2 supply the units of the identification circuits. To allow operation of matrices CIC, CIG voltage V1 should not be positive with respect to the supply voltage of the circuits of switchboards K; preferably voltage V1 is equal to this supply voltage; on the other hand, voltage V2 should be negative with respect to voltage V1.

The operation of identification circuits CIC, CIG is as follows.

Under idle conditions, the state of semicord and trunk is that shown in FIG. 2. When the operator inserts the corresponding plug into the associated jack, the connection between voltages V1 and V2 is closed through wire b of the loops and through conducting diode D2; a current is then present on said wire.

Core Nr detects said current and signals to central part ICA, ICB (FIG. 1) of identifier ID an identification request. When the central part is available for request processing, it orders the operation of relay Y, whose contact ry is connected in series to wire 1a of the semicord which sent the request; as a consequence, current passes from voltage source V1 to source V2 through wires 1a, 2a of the loops, and an answer is received from both core Ny of the semicord and core Ng of the engaged trunk. If only the desired core Ny and only one core Ng answer, the identification is carried out; in fact a particular time slot is assigned to each unit and the identities of the engaged semicord and trunk are detected according to the instant at which the requests of identification and the answers of cores Ng are received.

As a consequence of successful identification, relays P and F are operated and their contacts pa, pb, fa, fb switch and cut off the identification circuit; then, the answers of cores Ny, Ng, Nr are no longer present.

Under these conditions, the semicord is connected to the trunk and the call can be set up.

Any malfunctions, for example non-answer of a core, answers of many cores Ng at the same time, etc., are detected by the central unit of the identifier, as will be described hereinafter.

It is to be noted that such a structure removes the possible doubts resulting from many contemporary requests of identification. In fact, in this case it is necessary to recognize each interconnected semicord-trunk pair by sending the operation order to only one relay Y at a time, chosen according to suitable priority criteria, so that only the answer of core Ng of the trunk engaged by the selected semicord is obtained.

Figures 3, 5:
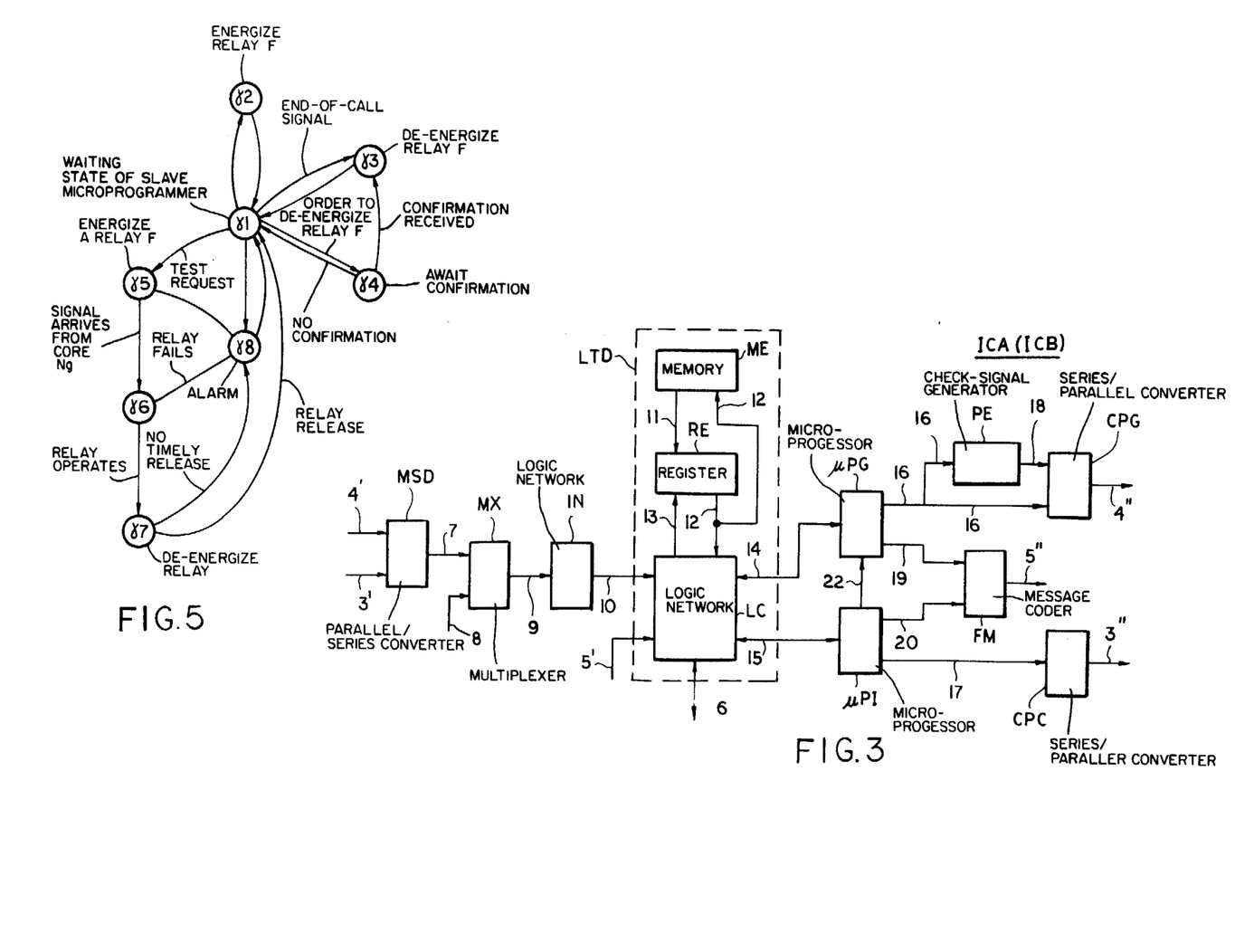
FIG. 3 is a block diagram of a central part of the identifier of FIG. 1.
FIGS. 4 and 5 are flow charts of identifier microprograms.

In FIG. 3, a circuit MSD organizes and synchronizes the signals coming from identification circuits CIC, CIG (FIG. 1) through wire groups 3', 4' of connections 3, 4. For instance, circuit MSD receives in parallel the serial signal trains emitted by each switchboard K (FIG. 1) and by each trunk GO and emits on a connection 7, a single signal train, where a particular time slot is allotted to each device (semicord or trunk). The operations of circuit MSD are clocked by a time base, not represented, which clocks also the operations of the subsequent circuits of controller ICA or ICB. Devices which carry out the functions of circuit MSD are known in the art wherefore, and a detailed description is unnecessary. Reference MX (FIG. 3) indicates a multiplexer, which has to combine into a single frame the signals coming from circuit MSD and the testing signals present on a connection 8 coming from testing equipment, not represented. Reference IN indicates an integrating logic network which carries out the digital integration of the signals coming from multiplexer MX and present on a connection 9, for distinguishing between the real state transitions of said signals and possible noises.

The integrated signals are sent through a connection 10 to a logic network LTD, called hereinafter "data processing logic", comprising of a combinatory network LC, a register RE and a memory ME. In data-processing logic LTD, combinatory network LC carries out the logic operations related to the processing of the identification requests. To carry out these operations, network LC makes use of data read in memory ME and received through connection 11, register RE, connection 12; signals coming from integrating logic IN; orders sent through connections 14, 15 by two microprogrammed logic networks μPI, μPG, whose functions are described hereinafter; and orders coming from computer EL (FIG. 1) through wires 5' of connection 5. Register RE (FIG. 2) stores the partial results of the operations carried out by network LC, received through connection 13.

Memory ME is a read-write memory, and has an address for each semicord and each trunk connected to the equipment. At the addresses related to the semicords the memory stores the bits representing the state of cores Nr, Ny, Np (, hereinafter called bits BR, BY, BP); alarm bits whose logic value indicates any malfunction of relays Y or P (bits indicated by BYa, BPa) during the present or the previous operating cycles of the identifier; and a bit indicating if any identification request can be accepted (bit of real request Rr, generated as described hereinafter).

The memory positions related to the trunks store the state bits of cores Ng, No, Nf indicated by BG, BO, BF; an alarm bit BGa and a trunk-disabling bit BGd, whose logic values indicate any malfunction previously detected in the answer of core Ng; an alarm bit BFa indicating a malfunction of relay F; and three bits D", H", which represent the codification of the orders coming from the computer and related to the operations of relay F. More particularly, bit E represents "a release request for relay F"; bit D" is a confirmation of release order for relay F" and bit H" is an operating order for relay F".

Memory ME is cyclically read and written in on the command of the time base, and is updated with the results of the operations carried out by network LC; these results are received from register RE through connection 12.

The operations carried out by combinatory network LC for processing an identification request are as follows:

(1) checking whether the request can be accepted, i.e. if bit BR has passed from 0 to 1 and alarm bits BYa and BPa related to the calling semicord are at 0; under these conditions, bit Rr passes to 1;

(2) checking that only relay Y of the calling semicord is energized as a consequence of a command generated by network LC, i.e. that bit BY of only that semicord changes from 0 to 1;

(3) checking that only one core Ng answers upon closing of contact ry in the circuit of wires 1a, 2a (i.e. that only one bit BG moves to 1);

(4) checking that relay P of the semicord operates (bit BP is set to 1) and, as a consequence, that the answer of core Ny is no longer present (bit BY must move from 1 to 0);

(5) checking that only relay F connected to the identified trunk operates (bit BF moves from 0 to 1); and (6) checking that the sequence of core answers is right.

It is then clear that the work carried out by network LC during an identification procedure affects all the devices and that each device has to carry out more operations; as a consequence, more successive working cycles of the identifier are requested.

During each elementary time slot of the cycle, network LC will carry out a partial operation related to the device corresponding to that particular time slot and will store in register RE the result obtained; the latter will be collected during the first time slot allotted to a device of the same type for carrying out new partial operation, and so on. The final result will update memory ME and will be sent to μPI, μPG for conditioning their microprograms. During each processing phase, the situation of alarm bits in memory ME is updated by moving them, for instance, to logic value 1 if any malfunction occurred.

Furthermore, it is clear that both network LC and register RE work on several bits at the same time; therefore, they will be composed of as many sections as there are processed bits.

The described operations can be easily represented by Boolean equations.

By way of example, the equation corresponding to a second phase (control of the answers of cores Ny) is illustrated by indicating with "n" the number of semicords connected to the exchange, with "$BY_k$" the bit BY related to the calling semicord and with "$\overline{BY}$" the non-answer of a core Ny; the checking that only relay Y of the calling semicord is operated corresponds to the carrying out of the following operation by network LC:

$$BY_k \cdot \prod_{i=1}^{k-1} \overline{BY_i} \cdot \prod_{j=k-1}^{\eta} \overline{BY_j} = 1$$

The other equations corresponding to the different working phases can be easily obtained.

Logic networks μPG, μPI, which can consist of only one microprocessor, organize and supervise the operations necessary for processing identification requests, prepare messages of successful identification for the computer and send orders to the identification circuits.

More particularly, microprocessor μPG, which is slaved to microprocessor μPI and is enabled to work at suitable instants of the request-processing cycle or under particular conditions described hereinafter, checks the operations of relays F, i.e. sends orders for operation and release of said relays and checks correct execution. The orders are sent to matrix CIG (FIG. 2) through a circuit CPG (FIG. 3) which receives from microprocessor μPG, through a connection 16, time-division-multiplexed signals, and transforms said signals into space-division-multiplexed signals sent to each relay F through wires 4" of connection 4.

Network μPI controls the operations related to the cords and taking place in logic network LTD and sends, at suitable instants, the operating orders for relays P and Y of matrix CIC (FIG. 2). These orders are sent to matrix CIC through a device CPC (FIG. 3) which, upon receiving through a connection 17 the time-division-multiplexed signals, transforms them into space-division-multiplexed signals sent to the involved relays through wires 3" of connection 3.

Connection 22 represents the links between the microprocessors μPI and μPG.

Network μPI supervises the entire equipment; the term "supervision" indicates in part the operations involved in the functional switchover of the two units ICA, ICB, if the equipment is duplicated.

The functions of these networks will be explained by the description of the corresponding microprograms.

PE reference indicates a device which, upon request of the exchange staff and under the control of microprocessor μPG, checks the operation, holding and release of relays F (FIG. 2) of all the trunks. To this end, device PE (FIG. 3) receives from microprocessor μPG through connection 16 the related orders and transmits them to the relays F through unit CPG, connected to device PE through a connection 18. Because of the presence of device PE, the exchange staff can detect any malfunction, even of the rarely engaged trunks.

Reference FM indicates a message formatter or coder which, receiving from microprocessors μPI and μPG, through connections 19, 20, the information on the identity of a semicord-trunk pair engaged by a call, combines them into a message suitable for computer EL (FIG. 1); said message is sent to computer EL through wires 5" (FIG. 3) of connection 5.

The total operation of the aforementioned equipment will be discussed in the following description of the microprograms of the two networks μPI, μPG.

Figure 4:
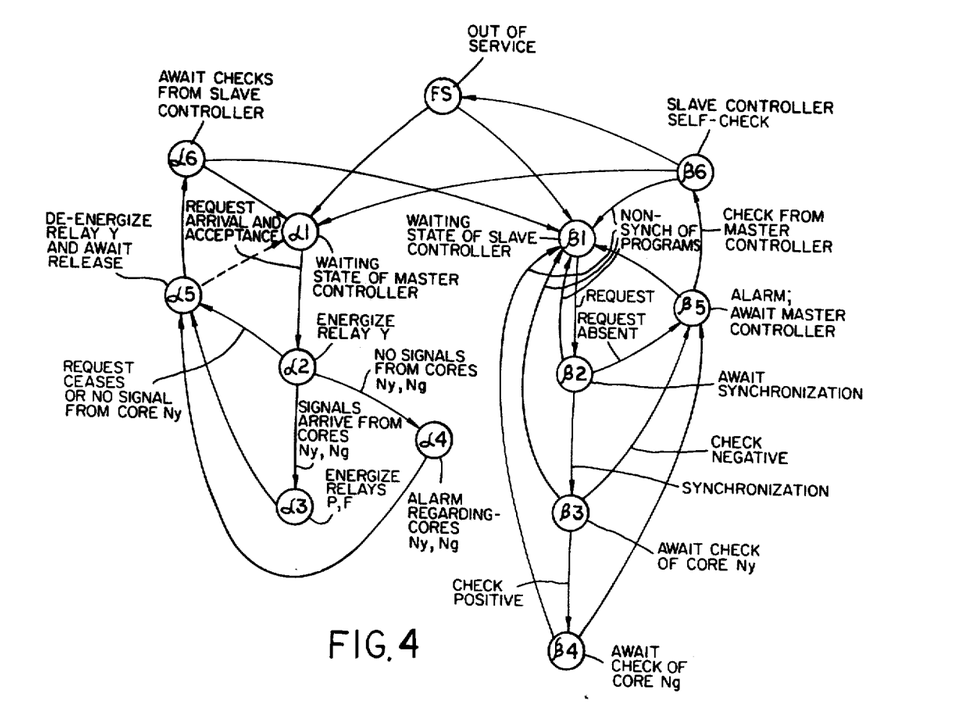

FIG. 4 shows the identification microprogram, regulating the operation of network μPI.

At the beginning of the operation, the main unit of the identifier is at state $\alpha 1$, corresponding to the idle state.

For duplicated equipment, in state $\alpha 1$ the considered unit (e.g. ICA, FIG. 1) is idle as "master"; correspondingly, unit ICB will be in a state $\beta 1$ (FIG. 4), i.e. in an idle state as "slave". Since duplicated units ICA, ICB (FIG. 1) act alternatively as "master" and "slave", the following description illustrates the operation of network μPI (FIG. 3) of only unit ICA which performs in one cycle as "master" and in a subsequent cycle as "slave".

In phase $\alpha 1$ (FIG. 4) unit ICA checks whether an identification request is coming and awaits that network LTD (FIG. 3) checks whether said request can be accepted. If the request is valid, unit ICA reaches state $\alpha 2$ (FIG. 4) upon sending the operation order to relay Y of the calling semicord; in the negative, this unit remains in state $\alpha 1$.

State $\alpha 2$ represents the wait for the answers of core Ny (FIG. 2) related to the calling semicord and of only one core Ng. The program remains in this state for an established maximum time.

If, within said time, cores Ny and Ng answer correctly (i.e. if answers come only from the desired core Ny and from only one core Ng), state $\alpha 3$ (FIG. 4), described hereinafter is reached.

If, on the contrary, the answers are not correct, the cases are as follows:

(a) The request disappears before the arrival of the answers of cores Ny and Ng; there is a transition from state $\alpha 2$ to state $\alpha 5$, corresponding to the suppression of the operating order for relay Y and to waiting for the relay's release; from this state, the idle state is reached if the equipment is not duplicated; otherwise, there is a transition to a state $\alpha 6$ of "waiting for the slave" discussed hereinafter. In state $\alpha 5$ it is possible to remain for an established maximum time; if at the cord end of this time relay Y has not released, logic network LTD (FIG. 3) is informed and bit BYa is set to 1, as already described.

(b) The desired core and other cores Ny (FIG. 2) or a different core Ny answer; a transition then occurs from state $\alpha 2$ (FIG. 4) to state $\alpha 4$ corresponding to "alarm recording for relays Y" in which logic network LTD (FIG. 3) sets to 1 the bits BYa related to all the cores that answered improperly.

State $\alpha 4$ (FIG. 4) is maintained for an established time and then a transition occurs to state $\alpha 5$ and the cycle continues as in the previous case.

(c) No core Ng (FIG. 2) answers within a pre-established time; a transition then occurs from state $\alpha 2$ (FIG. 4) to state $\alpha 5$, as in case (a).

(d) A plurality of cores Ng (FIG. 2) answer; there is then a transition to state $\alpha 4$ (FIG. 4) and the alarm bits BGa related to all the answering cores Ng (FIG. 2) are set to 1 in memory ME (FIG. 3) whereupon the cycle continues as in case b).

The transition from state $\alpha 2$ to state $\alpha 3$ (FIG. 4) corresponds to a successful identification. During this phase 3 the central unit ICA emits an operation order for relay P of the calling semicord and an enabling order for the microprogram of network μPG (FIG. 3), as described hereinafter, and sends a message of successful identification to the computer.

In state $\alpha 3$ (FIG. 4) the central part awaits the answer of core Np (FIG. 2) and passes to state $\alpha 5$ (FIG. 4) if core Np (FIG. 2) answers within a pre-established time; the central unit awaits in state $\alpha 5$ (FIG. 4) the release of relay Y and then passes to state $\alpha 6$ or comes back to the idle state (state $\alpha 1$), depending on whether a duplicate controller ICB exists. If core Np does not answer, microprocessor μPI of unit ICA—before leaving state $\alpha 3$—sets to 1 the alarm bit BPa related to the relay P involved and passes to state $\alpha 5$ upon a release order for relay Y.

If, in a microprogram state different from state $\alpha 2$, there is an answer of a core Ng (e.g. due to the presence, on wire $2a$ of the trunk or on wire $1a$ of the operator semicord engaging said trunk, of a ground voltage with a consequent current flow), the situation is signalled to logic network LTD (FIG. 3) which sets to 1 the disabling bit BGd related to that trunk.

The disabling is operative as long as core Ng (FIG. 2) answers; consequently, the answer of that core during microprogram operation cannot be considered valid. It is to be understood that the expression referring to "answer of only one core Ng" should be considered as "answer of only one not disabled core Ng".

The disabling of the trunks whose cores Ng answer out of sequence is necessary because the continuous answer of a core Ng could prevent all the successive identifications.

The central unit can also move from each microprogram state to an "out-of-service" state, indicated by FS (FIG. 4). The transition to the "out-of-service" state takes place when the central unit remains in a given state, with the exception of the idle state, for a time longer than the corresponding pre-established time, or when the microprogram is in a state not corresponding to any operating condition, or when any malfunction is detected.

In the case of the out-of-service state, it is still necessary to ensure the handling of calls; therefore, if the central unit ICA is the only one or if both units ICA, ICB are out of service at the same time, all relays F and all relays P of both engaged and free devices are operated at the same time, so as to reestablish the loop continuity.

Obviously, the possibility of trunk identification is lost, but the consequences are subordinate to the necessity of ensuring telephone service.

The forced operation ends, but only for free devices, when the central unit, or at least one of the central units, comes back into service. The out-of-service state FS is left upon a manual order or the order of testing equipment, if the conditions which brought about the out-of-service state have disappeared. If the equipment is not duplicated or if also unit ICB (FIG. 1) is out of service, state $\alpha 1$ is reached (FIG. 4); if unit ICB (FIG. 1) is provides and operative, state $\beta 1$ (FIG. 4) is reached wherein unit ICA (FIG. 1) is in an idle state as "slave".

In the case of duplicated central equipment, organized as described, the central unit ICA passes from state $\alpha 5$ (FIG. 4) to state $\alpha 6$, independently of the previous state of unit ICA (FIG. 1).

In this state, unit ICA waits for twin unit ICB (FIG. 1) to end its cycle as "slave"; if some checks described hereinafter have given positive results (i.e. if the operation is correct), unit ICA passes to state $\beta 1$ (FIG. 4), where it is in idle state as "slave" (i.e. it waits to begin a new cycle as "slave"). If checks were negative, controller ICA goes back to state $\beta 1$ (idle state as "master").

Unit ICA (FIG. 1) leaves state $\beta 1$ when twin unit ICB (now acting as "master") or unit ICA itself receive a new request of identification. This request could be the first one met during the cyclic scanning of the memory, starting from the position corresponding to the instant at which the previous identification ended, or the oldest one among the waiting requests, if memory ME (FIG. 3) stores the arrival instant of each request.

If in the "slave's" passing from state $\beta 1$ (FIG. 4) to state $\beta 2$ the "master" unit has initially received the request, the "slave" unit is synchronized upon said request and checks its validity (the "slave" unit receives the same request); if, on the other hand, the request has been received first by the "slave" unit, the latter waits for the "master" unit to receive a request and check that said request corresponds to the one received by the "slave" unit.

This phase corresponds to a synchronization between the programs of the two units.

The "slave" unit can leave state $\beta 2$ in different ways:

(a) Towards a state $\beta 5$, i.e. "waiting for the master unit" (described hereinafter), if at the end of a predetermined time the "master" unit has not received the request or the request initially received by the "master" is not considered correct by the "slave"; under these conditions, a suitable signaling for the exchange staff is provided.

(b) Towards state $\beta 1$, calling at the same time for the intervention of check or testing equipment, if the "slave" unit is not synchronized with the request that the "master" unit was intended to process.

(c) Towards a state $\beta 3$, if the "slave" unit has received the same request of the "master" or is synchronized with it and has checked its validity; the "slave" unit remains in state $\beta 3$, waiting for the "master" unit to receive the answer of core Ny (FIG. 2) and for the "slave" unit itself to receive the same answer.

The "slave" unit passes from state $\beta 3$ (FIG. 4):

to state $\beta 1$, calling for the intervention of the testing equipment, if there is no longer synchronization between the programs of the two units;

to state $\beta 5$, if within a predetermined time the "master" unit has not received the answer of Ny (FIG. 2) or if the "slave" unit does not receive the same answer of the "master";

to state $\beta 4$ (FIG. 4), if the operations of the previous phase $\beta 3$ have given positive results.

In state $\beta 4$, the "slave" unit waits for the "master" to receive the answer from only one core Ng and then it checks if it received the same answer as the "master". The "slave" unit passes from state $\beta 4$ to state $\beta 1$, in case of microprogram nonsynchronization, or to state $\beta 5$. The passage from state $\beta 4$ to state $\beta 5$ takes place if the operations of the first phase have given either positive or negative results; in the second case, signaling is also sent to the exchange staff, as in the previous phases.

In state $\beta 5$, the "slave" unit waits for the "master" unit to reach phase $\alpha 6$, i.e. the state "waiting for the slave". If the "master" unit reaches state $\alpha 6$ within a pre-established time, the "slave" passes from state $\beta 5$ to state $\beta 6$; if not, the "slave" comes back to state $\beta 1$ and calls for the intervention of the testing equipment.

In state $\beta 6$, the "slave" unit, which is to become "master", checks whether it can ensure the correct holding of relays F and, in the affirmative case, transfers the contents of memory ME (FIG. 3) of the "master" unit to its own memory. Such transfer is necessary because the "slave" unit is not enabled to set alarms in its memory and has to receive from the "master" unit the updated information concerning the alarm situation.

The checking of the holding of relays F consists in verifying the capacity of a central unit to hold operated all the already operated relays F, in order to avoid the interruption of the calls in progress. The holding of relays F, in case of duplicated equipment, depends on the unit acting as "master" and should be properly checked before the interchange of functions between the two units. This check is carried out, even if there is only one central unit, in all the microprogram states.

If the check has given positive results, the "slave" unit passes from state $\beta 6$ to state $\alpha 1$ as soon as the transfer operations of the memory contents have ended. At the same time, the current "master" unit passes from state $\alpha 6$ to state $\beta 1$.

The "slave" unit can also move from state $\beta 6$ to state $\beta 1$, if the "master" unit is checking the behavior of relays F of all the trunks, as described hereinafter.

If the checking of the holding capacity of relays F gives negative results, the "slave" unit passes to the out-of-service state and orders the operation of all relays P and all relays F, as already said, if both units are out of service.

This state is abandoned under the conditions described for the "master" cycle. The "slave" unit passes to state $\alpha 1$ (idle state as "master") if the other unit is out of service; it passes to state $\beta 1$ (idle state as "slave") if the other unit operates.

It should be noted that all commands for the peripheral unit concern only the "master" equipment and cannot be carried out by the "slave".

During the passage from state $\alpha 2$ to state $\alpha 3$ of the identification microprogram, an enabling order is emitted to microprocessor PG for the progress of the trunk microprogram, as shown in FIG. 5.

Upon this command, network $\mu$PG (FIG. 3) passes from idle state $\gamma 1$ (FIG. 4) to a state $\gamma 2$ where it orders the operation of relay F; from state γ2 it goes back to state γ1 either after the operation of relay F or at the end of a predetermined time, if relay F has not operated (non-arrival of the signal Nf, FIG. 2).

In the second case, logic network LTD (FIG. 3) signals the malfunction by setting to 1 the alarm bit BFa of that trunk.

Network μPG leaves again the idle state γ1 (FIG. 4) in the presence of a trunk-disconnecting signal (disappearance of the answer of core No, FIG. 2) at the end of the call; then it reaches a state γ3 (FIG. 4), corresponding to order for release of relay F", which is changed to the idle state upon either release or non-release of relay F within a predetermined time; in the latter case, logic LTD (FIG. 3) stores the related alarm.

State γ1 can also be left, if network μPI is in an idle state and no identification requests have to be processed, when a release order for relay F arrives from computer EL (FIG. 1). Network PI then it passes to a state γ4 (FIG. 4) wherein it awaits the confirmation of the computer's order; if the confirmation arrives within the alotted time, the microprocessor network passes to state γ3, i.e. an actual release order for relay F, from which it passes to state γ1.

From state γ4, logic LTD can go directly back to the idle state if the confirmation does not arrive within a predetermined time; as a consequence, the release order is removed.

Another possibility of leaving state γ1, if the microprogram is in its idle state and no identification requests are waiting to be processed, is represented by the request, from the exchange staff, to test the operation of relays F of circuit CIG (FIG. 2).

The microprogram, for each relay to be checked, passes from state γ1 to state γ5 corresponding to the sending of the operation order for the relay under examination.

In this state the microprocessor μPG remains for a predetermined time, awaiting the confirmation that the operation has occurred (answer of core Ng); in the affirmative, it passes to state γ6 where it remains for a certain time checking that the relay remains operated and, if this happens, it passes to state γ7, i.e. an order for release of the operated relay. If, after a certain time, the relay is really released, network PG goes back to the idle state γ1, disabling the testing device PE for a time corresponding to an operative cycle of the identifier, so as to allow a full scanning of memory ME (FIG. 3) for checking if identification requests have arrived. In the negative, the above-described cycle is repeated for the next relay F.

States γ5, γ6, γ7 are also left for a state γ8 in case of no operation or release of the relay within preset intervals or of a failure to hold for a predetermined time.

From state γ8, corresponding to the disabling of the testing operation, network PG goes back to the idle state, generating at the same time an alarm signal. State γ8 is reached directly from state γ1, when the testing concerns a relay whose malfunction had already been detected during a previous identification operation (i.e. a relay whose alarm bit BFa in memory ME is at 1).

The trunk microprogram is not provided with phases for both the "master" unit and the "slave". This program concerns the control of relays F and the control operations are carried out only by the master unit; therefore, during an identification operation, only network μPG (FIG. 3) of the unit acting as "master" for that identification, will be active whereas network μPG of the unit acting as "slave" will be in the idle state.

The transitions that in the described trunk microprogram occur upon a computer order concern the procedures for conferences among operators and the procedures for connection transfers from one operator to another. These cases are described with reference to FIG. 6.

Figure 6:
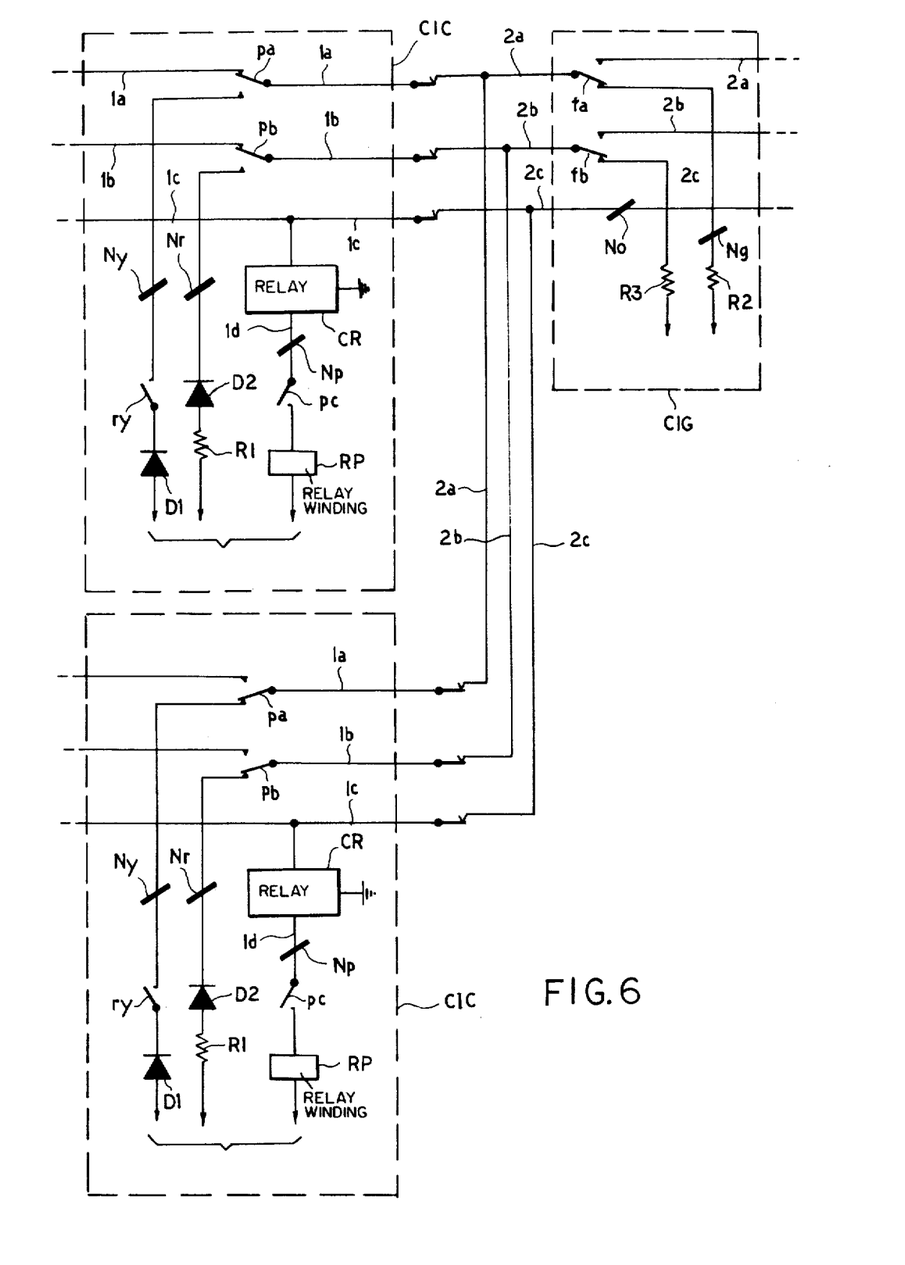
FIG. 6 is a circuit diagram similar to FIG. 2, showing a double identification.

If an operator engages, with a semicord plug, a jack corresponding to a trunk already engaged by another operator and already identified, the identification procedure cannot occur, because wire 1b presents a voltage lying between the ground potential and voltage V1 and then diode D2 of the second semicord is inhibited and sensor Nr does not present current. The insertion of a second semicord does not affect a call in progress on the connection already set up, because it does not greatly change the magnitude of the currents.

The connection of a second semicord to a trunk already engaged can occur in three cases: by operator mistake, for a connection transfer and for a conference set-up.

In the first case (mistake), the second operator does not obtain the identification and has to remove the plug.

In the second case, it is assumed that the first operator, who has already set up a connection, asks that a second operator takes his place for the connection processing.

Then, the first operator asks the second one to engage with a free semicord the jack corresponding to the trunk already engaged in the previous connection and, after the engagement by the second operator, the first operator removes his semicord.

As a consequence, the current disappears in wire 1d of the semicord of the first operator, but not in wire 2c which is connected to wire 1c of the second operator.

Computer EL (FIG. 1) detects then the removal of the semi-cord of the first operator, not followed by the disconnection of the trunk connected to that semicord. In this case, the computer sends to the identifier an order for release of relay F of the trunk already connected to the free semicord and the resulting circuit is again similar to that described for a single identification, through the connection downstream of the trunk has never been released. As a consequence, the second operator uses the connection set up by the first operator.

In case of a conference being set up, it is necessary that the first operator who engaged the trunk asks a second operator to engage the same trunk with his semicord, as in the previous case. After the latter engagement, the first operator, instead of disconnecting, asks the computer for a new identification through a button of the switchboard.

The computer, after request detection, sends to the identifier a release order for relay F of the trunk connected to the semicord which sent the request. The identifier carries out the order and the resulting circuit is as shown in FIG. 6. The presence of the first operator does not change the situation of the identification circuit, because relay P is still attracted and disconnects the circuit towards sensors Nr and Ny; on the other hand, the semicord of the second operator is under normal identification conditions and thus the identification is regularly carried out. After the identification, relays P of both concerned semicords and relay F of the trunk are operated, and the two semicords and the trunk are connected together. If the first operator does not obtain the conference connection within a reasonable time (e.g. because the second operator used a semicord in alarm state so that the identification was not successful). he can ask for the restoration of the connection by pressing another button of the switchboard.

Then the computer, after the detection of the semicord request, sends to the connected trunk, through the identifier, an operating order for relay F. After relay F is operated, the situation is similar to the initial one.

It is thus clear that the identifier can also supervise switchboard and trunk operation. In particular, because of the characteristic structure of the identification circuit, any wire interruption or any lack of supply, particularly in the trunk input circuits, short circuits among the wires (answers of more cores Ng), etc. can be easily detected. Obviously, duplication allows the supervision of the identifier operations.

We claim:

1. In a telecommunication system including a switchboard with a multiplicity of incoming lines and a multiplicity of outgoing lines,
   the combination therewith of a line identifier connectable to a computer for monitoring switchboard activity with the aid of said computer and for establishing a communication link between a selected incoming line and a selected outgoing line in response to manual operations at said switchboard, said line identifier comprising:
   first detector means connected to said switchboard for emitting to said computer a signal coding the identity of said selected incoming line and for requesting the identification of said selected outgoing line;
   second detector means connected to said switchboard and activable by said computer for informing same of the identity of said selected outgoing line; and
   switching means coupled to said incoming and outgoing lines for connecting, under the control of said computer, said selected incoming line to said selected outgoing line upon the identification thereof by said first detector means and said second detector means, respectively.

2. The combination defined in claim 1 wherein said first detector means includes a matrix of current sensors each operationally coupled with a respective first circuit portion in turn associated with a respective incoming line, said sensors being connectable to said computer for communicating identification requests thereto, said first detector means further including a multiplicity of second circuit portions associated with respective outgoing lines, a first circuit portion associated with said selected incoming line forming a closed circuit, upon the execution of a loop-closing operation at said switchboard, with a second circuit portion associated with said selected outgoing line, thereby energizing a corresponding sensor of said matrix to emit an identification-request signal to said computer.

3. The combination defined in claim 2 wherein said second detector means includes another matrix of additional current sensors each operationally coupled with a respective third circuit portion in turn associated with a respective line, said additional sensors being connectable to said computer for communicating thereto the identity of said selected outgoing line, said second detector means further including a multiplicity of fourth circuit portions associated with respective incoming lines, said second detector means further including in each fourth circuit portion a normally open switch closable by said computer, a third circuit portion associated with said selected outgoing line forming a closed circuit, upon the execution of a loop-closing operation at said switchboard and upon the closing of a switch in a fourth circuit portion associated with said selected incoming line, with such fourth circuit portion associated therewith, thereby energizing a corresponding additional sensor to emit to said computer a signal identifying said outgoing line.

4. The combination defined in claim 3 wherein said switching means includes double-pole double-throw switches connected to said circuit portions and to said incoming lines and said outgoing lines for forming a communications link between a selected incoming line and a selected outgoing line upon breaking a first connection formed between a first circuit portion and a second circuit portion for identifying the selected incoming line and a second connection formed between a third circuit portion and a fourth circuit portion for identifying the selected outgoing line.

5. The combination defined in claim 4 wherein said sensors are magnetic induction sensors emitting hysteresis-dependent signals.

6. The combination defined in claim 5 further including checking means monitoring the operation of said switching means.

7. The combination defined in claim 6 wherein said first circuit portions and said fourth circuit portions are connected to a first voltage source and said second circuit portions and said third circuit portions are connected to a second voltage source greater in potential than said first voltage source.

* * * * *